Oct. 4, 1960  O. W. WOOD  2,955,066
METHOD FOR PERFORATING MOVIE FILM SPLICING TAPE
Filed Sept. 7, 1956  3 Sheets-Sheet 1

INVENTOR.
O. WENDELL WOOD
BY Morgan, Finnegan, Durham & Pine
ATTORNEYS.

Oct. 4, 1960  O. W. WOOD  2,955,066
METHOD FOR PERFORATING MOVIE FILM SPLICING TAPE
Filed Sept. 7, 1956  3 Sheets-Sheet 2

INVENTOR.
O. WENDELL WOOD
BY
Morgan, Finnegan, Durham & Pine
ATTORNEYS.

Oct. 4, 1960 O. W. WOOD 2,955,066
METHOD FOR PERFORATING MOVIE FILM SPLICING TAPE
Filed Sept. 7, 1956 3 Sheets-Sheet 3

INVENTOR.
O. WENDELL WOOD
BY
Morgan, Finnegan, Durham & Pine
ATTORNEYS.

United States Patent Office 2,955,066
Patented Oct. 4, 1960

2,955,066

METHOD FOR PERFORATING MOVIE FILM SPLICING TAPE

Oliver Wendell Wood, Liberty Corner, N.J., assignor, by mesne assignments, to Johnson & Johnson, New Brunswick, N.J., a corporation of New Jersey Filed Sept. 7, 1956, Ser. No. 608,510

5 Claims. (Cl. 154—125)

This invention relates to a novel method for perforating normally tacky and pressure-sensitive move film splicing tapes. More particularly, this invention pertains to a novel method for perforating simultaneously at least two layers of normally tacky and pressure-sensitive movie film splicing tape.

Recently, there has been developed a normally tacky and pressure-sensitive tape for splicing movie films to repair a break in the film or to connect a plurality of films to permit a continuous showing thereof. As is well known to those skilled in the field, a movie film is provided with a longitudinal row or rows of spaced perforations for indexing of the film as it passes through the projector. For example, 16 mm. silent film and 35 mm. sound film are provided with two longitudinal parallel rows of spaced perforations while 16 mm. sound film is provided with one row of perforations. In order that a spliced movie film employing a splicing tape be indexed as it passes through the projector, the splicing tape must also be provided with perforations corresponding to those present in the movie film.

A normally tacky and pressure-sensitive movie splicing tape requires special handling in carrying out the perforating operations because of the tacky characteristics of the tape. Great care must be taken so that the tape does not stick to the perforating machine or other undesirable surfaces which would result in damage to the tape or the perforating machine. Moreover, prior to the present invention, it has not been possible to perforate normally tacky and pressure-sensitive movie splicing tape quickly and efficiently.

Objects and advantages of the invention will be set forth in part hereinafter and in part will be obvious herefrom, or may be learned by practice with the invention, the same being realized and attained by means of the steps, methods, combinations and improvements pointed out in the appended claims.

The invention consists in the novel steps, methods, combinations and improvements herein shown and described.

An object of this invention is to provide a novel method whereby a plurality of layers of normally tacky and pressure-sensitive movie film splicing tape may be simultaneously provided with at least one longitudinal row of spaced perforations quickly and efficiently.

Another object of this invention is to provide a novel method whereby a plurality of layers of normally tacky and pressure-sensitive movie film splicing tape may be simultaneously provided with at least one longitudinal row of spaced perforations without any danger of causing harmful effects on the tape or the perforating apparatus.

The accompanying drawings, referred to herein and constituting a part hereof, illustrate one embodiment of the invention, and together with the description, serve to explain the principles of the invention.

Figure 1:
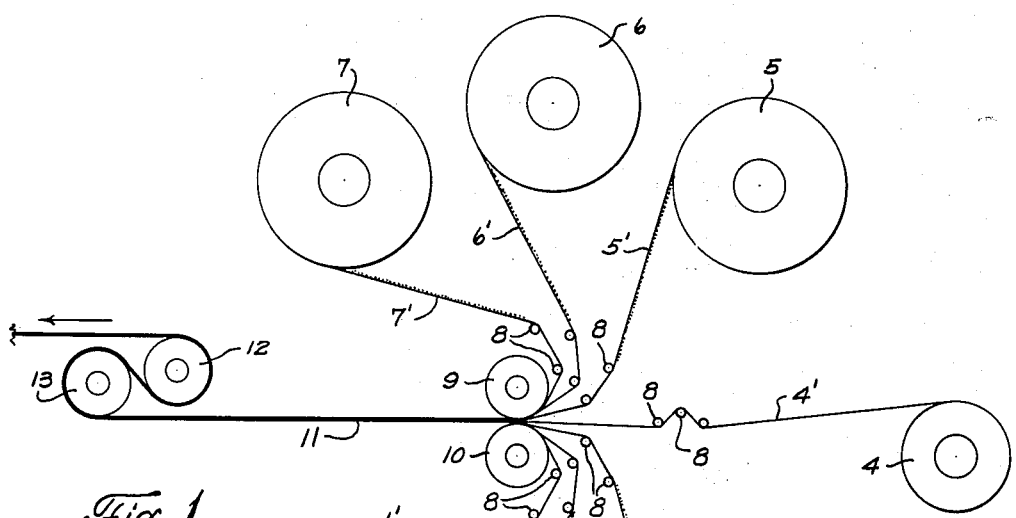
Fig. 1 is a diagrammatic view of an embodiment of an unwinding and strip assembly unit of apparatus for carrying out the process of this invention.

In general, this invention comprises forming a multiply strip consisting of a plurality of layers of a normally tacky and pressure-sensitive movie film splicing tape and subsequently perforating the strip in such a manner to provide at least one longitudinal row of spaced perforations. The movie film splicing tape to be perforated in accordance with this invention comprises a backing and a coat of a transparent normally tacky and pressure-sensitive adhesive. The backing may be of any suitable material for such purpose, such as of the same film material as the movie film to be spliced. The perforated strip is preferably delaminated immediately after the perforating operation to provide a plurality of individual one-ply perforated normally tacky and pressure-sensitive movie film splicing tapes.

As indicated above, in accordance with this invention, a multi-ply strip is produced comprising a plurality of layers of a normally tacky and pressure-sensitive movie film splicing tape. For purpose of convenience, the term "tape" will be used hereinafter in the specification in describing a normally tacky and pressure-sensitive movie film splicing tape. The multi-ply strip is formed in such a manner that the adhesive coat of each layer of tape does not contact any adhesive coat of another layer of tape or the stripper or die of the perforating machine in the perforating operation. Accordingly, the multi-ply strip includes a protective layer whose position in the strip will depend upon the number of layers forming the strip as will be disclosed in detail hereinafter.

In forming the multi-ply strip, a plurality of rows of tape and one roll of protective strip are unwound and laminated together under slight pressure. As indicated hereinabove, the layers are laminated in such a manner that the adhesive coats of the various layers of tape do not contact each other and also that the top and bottom surfaces of the strip are free of any adhesive coat.

After the multi-ply strip has been fabricated, it is then passed by means of suitable guide means to a threading perforator unit whereby it is threaded through a conventional perforating machine and perforated by means of a punch and die.

In the next operation, the perforated multi-ply strip is passed by suitable guide means to a multiple unwind unit whereby the strip is delaminated to provide a plurality of perforated single ply layers of tape.

In order to describe the invention more particularly, reference is now made to the accompanying drawings showing one embodiment for carrying out the present process. The apparatus shown is for the production of a seven-ply tape comprising six layers or ply of tape and one ply of a protective strip which in the structure illustrated is in the form of an interliner. It should be understood, however, that the embodiment shown is merely for the purpose of illustrating the invention. As will be evident to those skilled in the field, the principles of this invention are applicable to any multi-ply strip having at least two layers of tape.

As shown in Fig. 1, in forming the seven-ply strip, there are provided six rolls of tape 1–3 and 5–7 and a roll of protective strip 4, each of which is supported on a suitable core fixed to a support (not shown). The free ends 1'—7' of rolls 1—7 are then unwound from their respective rolls and passed over guide pins 8 between squeeze rolls 9—10, which are under slight compression to form a laminated seven-ply strip 11. Preferably, the squeeze rolls 9 and 10 are rubber covered metal rolls. As is shown in Fig. 1, the rolls 1—7 are positioned in such a manner that the adhesive coat of one tape does not contact an adhesive coat of another and that the top and bottom surfaces of the seven-ply strip 11 are free of adhesive coat.

Figure 2:
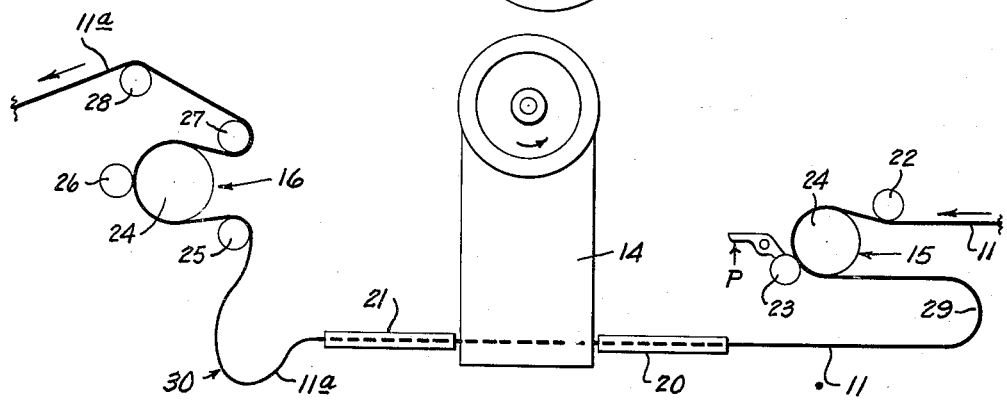
Fig. 2 is a diagrammatic view of one embodiment of a threading perforator unit of the apparatus for carrying out the process of this invention.

In the next operation the seven-ply strip 11 is passed to a threading perforator unit shown in Fig. 2 where it is perforated to provide at least one row of spaced perforations. Accordingly, strip or web 11 is passed to said unit by means of conventional power driven S pull rolls 12 and 13 (Fig. 1). As shown in Fig. 2, threading perforator unit comprises a conventional perforating machine, such as a Bell and Howell perforating machine, a primary pull roll unit 15 which receives the strip from the S pull rolls 12 and 13 and meters the strip to the perforator, and a secondary pull roll unit 16 which receives the perforated strip 11ª from the perforating machine 14.

Figure 3:
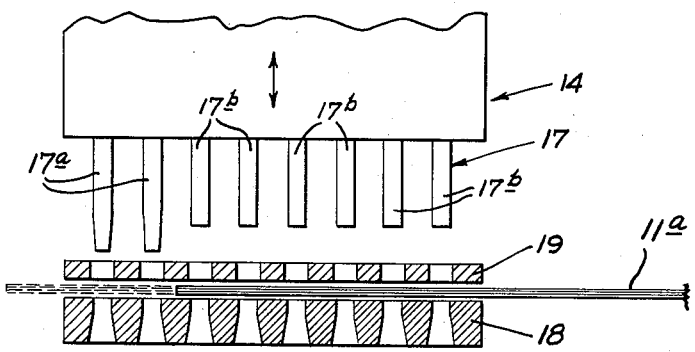
Fig. 3 is a diagrammatic, part sectional view, of the perforating machine of the threading perforator unit of Fig. 2 disclosing details of the punch and die.

As best shown in Fig. 3, the perforator machine is conventional and includes a punch 17 adapted to be moved up and down by means of a conventional flywheel and crank arrangement. The punch 17 comprises a row or rows of fingers, depending upon whether or not the strip is to be provided with a row or rows of perforations. The first two fingers 17ª of each row are pilot punches adapted to fit into the last two previously formed perforations to position the strip, after which the remaining fingers 17ᵇ pass through the strip to provide the desired uniform row of perforations. The perforator machine includes a conventional die 18 having a row of openings corresponding to the number of fingers of the punch and a stripper 19 with a like number of perforations. The purpose of the stripper is to prevent the perforated sheet from riding with the punch as it moves upwardly.

As will be evident to those skilled in the field, the punch operates intermittently. Accordingly, it is necessary to meter the strip as it is fed to the perforator machine and when it leaves the perforator. This is accomplished by pull roll units 15 and 16 and web guides 20 and 21 by which loops are formed in the web before and after the perforating operations. As shown in Fig. 2, pull roll unit 15 comprises power driven pull roll 24 and guide and tension rolls 22 and 23; and pull roll unit 16 comprises power driven roll 24 and guide roll 25—28. Pull roll unit 15 and web guide 20 cause loop 29 to form in the strip 11 while loop 30 is formed in the perforated strip 11ª by means of guide 21 and pull roll unit 16. Thus, it will be apparent that the multi-ply strip 11 may be brought to rest during the punching operation and the loops 29 and 30 still permit the continuous feed and withdrawal of the strip relative to the punch and die of the perforator.

Figure 4:
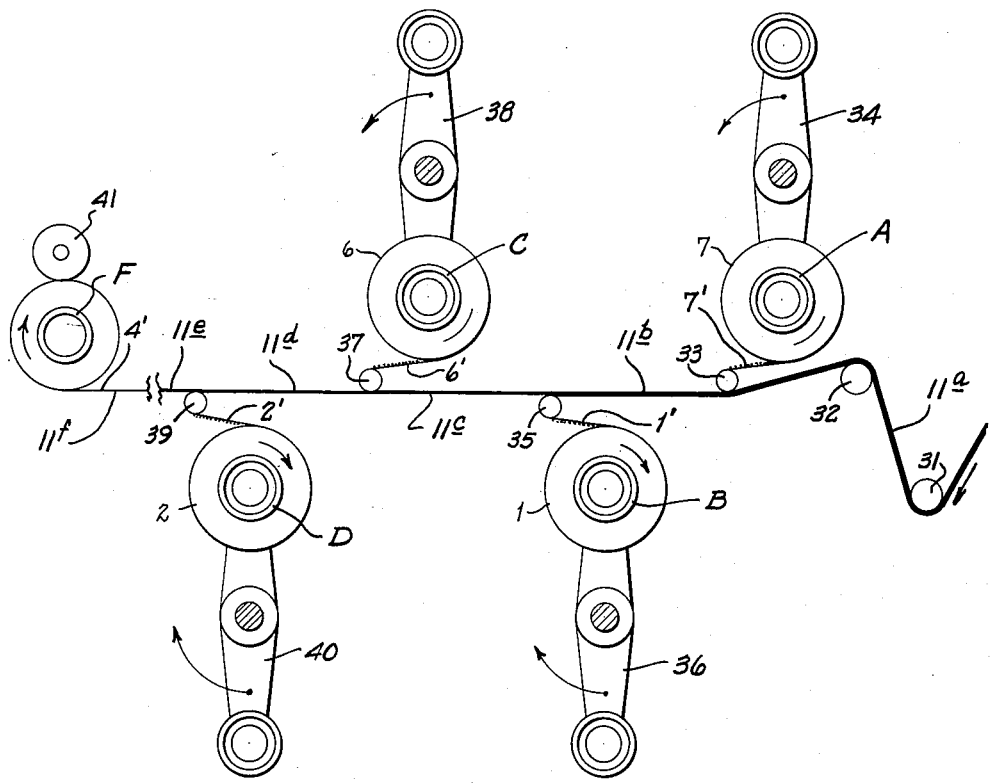
Fig. 4 is a diagrammatic view of one embodiment of a multiple windup unit of the apparatus for carrying out the process of this invention.

As indicated heretofore, it is preferred that the perforated strip be delaminated immediately after the perforating operation to provide a plurality of individual single ply tapes having at least one longitudinal row of spaced perforations. Accordingly, the perforated strip 11ª is passed from the pull roll unit 16 to the multiple windup unit shown in Figure 4.

More particularly, a perforated multi-ply strip 11ª is passed from roll 28 under dancer pin 31, over guide pin 32 and under guide pin 33 at which point the top layer of tape 7' is stripped from the seven ply perforated strip 11ª leaving a six ply strip 11ᵇ. Tape 7 is wound on a core A supported by a turret construction 34 described hereinafter in detail in discussing Figs. 5–7. Six ply strip 11ᵇ is then passed over guide pin 35 at which point lower layer of tape 1' is wound on core B supported on turret 36 leaving five ply strip 11ᶜ. Five ply strip 11ᶜ is then passed over guide pin 37 at which point layer 6' of the tape is wound on core C supported on turret 38, leaving four ply strip 11ᵈ. Four ply strip 11ᵈ is then passed over guide pin 39 at which layer of tape 2' is wound on core D supported on turret 40 leaving a three ply layer 11ᵉ. Although not shown in the drawings, layers 5 and 3 are wound on cores in a manner identical to that in which layers 6 and 2 or 7 and 1 are wound on cores C and D or A and B respectively leaving a two ply layer and a later single layer 11ᶠ which is the interliner layer 4'. Layer 4' is then wound on core F as shown. Above roll 4 there is provided a conventional counter wheel 41 which indicates the number of feet of interliner wound on core F which will be the same as the number of feet of tapes 1–3 and 5–7 wound on their respective cores.

Figure 7:
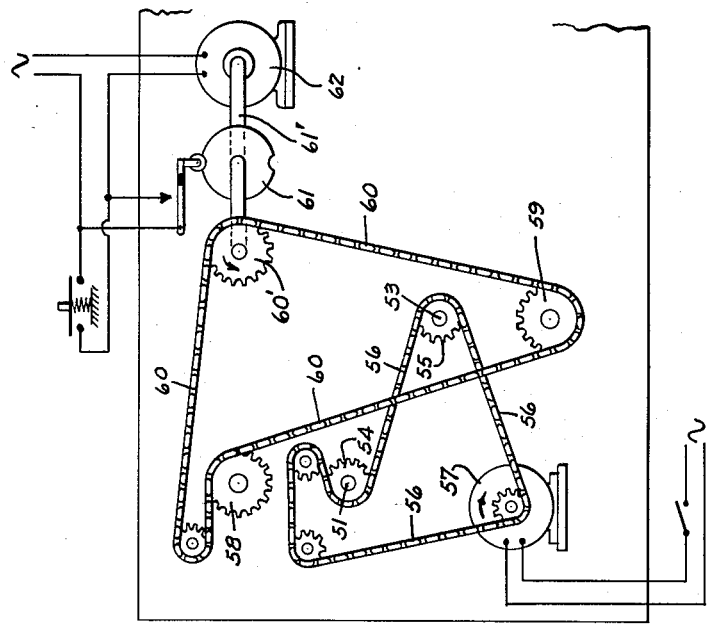
Fig. 7 is a rear view of the panel assembly of Fig. 5.
Figure 6:
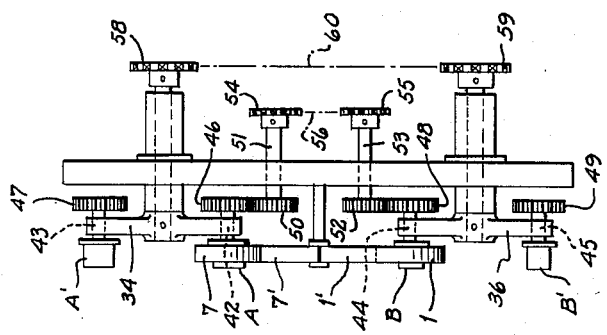
Fig. 6 is a view in side elevation of the panel assembly of Fig. 5.
Figure 5:
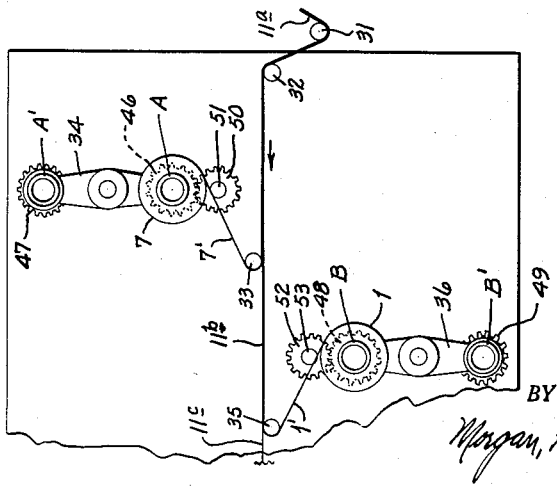
Fig. 5 is a fragmentary diagrammatic front view of a panel assembly illustrating details of the driving system of the first two winders depicted in Fig. 4.

Reference is now made to Figs. 5–7 which illustrate a panel assembly showing details of the driving system of the first two winders of the windup unit. It should be realized that the driving system shown for the top turret 34 and bottom turret 36 is for the purpose of illustration only and that the remaining turrets are driven in like manner.

As shown in the drawing turret or support 34 and turret or support 36 each support two cores, one of which is shown in a winding position and the other in an idle position. Means are provided for driving the cores when in winding position and for swinging the cores from winding position to idle position when a full roll of tape is wound thereon. At the same time, the empty cores are swung from idle position to winding position.

More particularly, core A in winding position, and having wound thereon roll of tape 7, is supported on turret 34 by means of spindle 42, while empty core A' in idle position is supported on turret 34 by means of spindle 43. In like manner, core B, in winding position and having thereon roll of tape 1, is supported on turret 36 by means of spindle 44 while empty core B' in idle position is supported on turret 36 by means of spindle 44. The driving means for the cores, when in winding position, comprise gear 46 mounted on spindle 42, gear 47 mounted on spindle 43, gear 48 mounted on spindle 44, gear 49 mounted on spindle 48, gear 50 mounted on spindle 51, gear 52 mounted on spindle 53, sprockets 54 and 55 coupled by chain 56, and driving motor 57. As best shown in Fig. 6, the driving motor 57 drives sprockets 54 and 55 through the sprocket and chain assembly shown which in turn rotates spindles 51 and 53 and gears 50 and 52 fixed to spindles 51 and 53. In turn gear 50 drives gear 46 causing the spindle 42 and core A to rotate while gear 52 drives gear 48 causing spindle 44 and core B to rotate. As will be evident to those skilled in the field, when the cores are reversed so that empty core A' and B' are in winding position, gear 50 drives gear 47 causing spindle 43 and core A' to rotate while gear 52 drives gear 49 causing spindle 45 and core B' to rotate.

The turrets 34 and 36 may be pivoted 180° by means of a sprocket and chain assembly comprising turret sprocket 58 and turret sprocket 59 which are coupled by chain 60 which runs over cam 61 which is driven by turret turnover motor 62. When the motor 62 is started, cam 60 is rotated counterclockwise as is chain 60 which drives sprockets 58 and 59 which in turn causes turrets 34 and 36 to rotate 180°.

Figure 8:
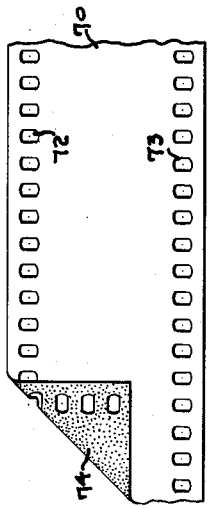
Fig. 8 is a plan view of a perforated adhesive tape perforated in accordance with this invention.

As shown in Fig. 8, each layer of tape perforated in the aforedescribed manner comprises a flexible backing 70 having parallel rows of spaced perforations 72, 73 and a coat 74 of a normally tacky and pressure sensitive adhesive applied to one side of said backing.

This application is a continuation-in-part of copending application Serial No. 593,006, filed May 7, 1956, and now abandoned.

The invention in its broader aspects is not limited to the specific steps, processes, combinations and improvements shown and described but departures may be made therefrom within the scope of the accompanying claims without departing from the principles of the invention and without sacrificing its chief advantages.

What is claimed is:

1. A method for perforating simultaneously at least two layers of a normally tacky and pressure-sensitive movie film splicing tape to provide at least one row of spaced perforations comprising, forming a multi-ply strip comprising at least two layers of a normally tacky and pressure-sensitive movie film splicing tape wherein the top and bottom surfaces of said strip are free of an adhesive coat and wherein the adhesive coat of each layer of tape is free of contact with an adhesive coat of each remaining layer of tape, and perforating said multi-ply strip in such a manner to provide at least one row of spaced perforations.

2. The method in accordance with claim 1 wherein the perforated multi-ply strip is delaminated to provide a plurality of single ply perforated normally tacky and pressure-sensitive movie film splicing tape.

3. The method in accordance with claim 1 wherein the multi-ply strip is formed by unwinding a plurality of rolls of tape and a roll of a protective strip, and pressing the separate layers of tape and the layer of protective strip together under pressure to laminate said layers.

4. The method in accordance with claim 2 wherein the perforated multi-ply strip is delaminated by winding one layer of said strip on an empty core in a winding position leaving a layer of one less ply and repeating this operation until each of the remaining layers of said strips have been individually wound on a core.

5. The method in accordance with claim 4 wherein a core containing a full roll of tape is moved from the winding position to an idle position and is replaced by an empty core in the winding position.

References Cited in the file of this patent

UNITED STATES PATENTS

| | | |
|---|---|---|
| 1,771,983 | Wandel | July 29, 1930 |
| 1,843,432 | Nickerson | Feb. 2, 1932 |
| 2,068,456 | Hooper | Jan. 19, 1937 |
| 2,283,629 | Heftler | May 19, 1942 |
| 2,565,367 | Greenhalgh et al. | Aug. 21, 1951 |
| 2,599,878 | Von Liedtke | June 10, 1952 |
| 2,628,929 | Persoon et al. | Feb. 17, 1953 |
| 2,695,668 | Roth | Nov. 30, 1954 |

FOREIGN PATENTS

| | | |
|---|---|---|
| 154,029 | Australia | Nov. 9, 1953 |